US007872964B2

(12) United States Patent
Tanimoto et al.

(10) Patent No.: US 7,872,964 B2
(45) Date of Patent: Jan. 18, 2011

(54) FILE TRANSMISSION TERMINAL

(75) Inventors: Yoshifumi Tanimoto, Kyoto (JP); Chikayoshi Yazaki, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 427 days.

(21) Appl. No.: 11/806,877

(22) Filed: Jun. 5, 2007

(65) Prior Publication Data
US 2008/0008108 A1 Jan. 10, 2008

(30) Foreign Application Priority Data
Jun. 6, 2006 (JP) .............................. 2006-157333

(51) Int. Cl.
G01R 31/08 (2006.01)
G06F 11/00 (2006.01)
H04L 1/14 (2006.01)
H04L 1/18 (2006.01)

(52) U.S. Cl. .................... 370/216; 714/50; 714/750; 714/751; 714/235; 370/235

(58) Field of Classification Search ................. 370/235, 370/216; 714/50, 750, 751
See application file for complete search history.

(56) References Cited

U.S. PATENT DOCUMENTS

| 6,089,765 | A * | 7/2000 | Mori ............................ 400/61 |
| 6,549,947 | B1 * | 4/2003 | Suzuki ....................... 709/229 |
| 2002/0012424 | A1 * | 1/2002 | Nishio et al. ........... 379/100.06 |
| 2003/0097629 | A1 * | 5/2003 | Moon et al. ................. 714/751 |
| 2004/0174894 | A1 * | 9/2004 | Sun et al. .................... 370/428 |
| 2005/0024411 | A1 * | 2/2005 | Takenouchi et al. ........... 347/16 |
| 2005/0206945 | A1 * | 9/2005 | Kumazawa ................ 358/1.14 |
| 2006/0031906 | A1 * | 2/2006 | Kaneda ...................... 725/113 |
| 2006/0050313 | A1 * | 3/2006 | Hashimoto et al. ......... 358/1.15 |
| 2006/0221391 | A1 * | 10/2006 | Okazawa et al. ........... 358/1.15 |
| 2007/0115823 | A1 * | 5/2007 | Shen ........................ 370/235 |
| 2007/0274264 | A1 * | 11/2007 | Jiang ........................ 370/333 |

(Continued)

FOREIGN PATENT DOCUMENTS

JP 2001-053945 A 2/2001

(Continued)

OTHER PUBLICATIONS

Japanese Office Action dated May 7, 2008, issued in corresponding Japanese Patent Application No. 2006-157333 with English translation.

*Primary Examiner*—Jayanti K Patel
*Assistant Examiner*—Saad Hassan
(74) *Attorney, Agent, or Firm*—Westerman, Hattori, Daniels & Adrian, LLP

(57) ABSTRACT

A file transmission technique that does not make retransmission control complex even in a case in which a transmission error occurs is provided. A communication terminal executes a transmission job for transmitting an inspection indication file to the apparatus. When there is an error either in transmitting the inspection indication file or in receiving an inspection result file, the communication terminal executes a retransmission job after a predetermined time lapses. At this time, if there is a new transmission job generated for the same apparatus, the retransmission job is deleted. Alternatively, if there is a different retransmission job for the same apparatus, a retransmission job that has been generated first is deleted.

8 Claims, 7 Drawing Sheets

U.S. PATENT DOCUMENTS

2008/0297827 A1 * 12/2008 Murata ..................... 358/1.15

FOREIGN PATENT DOCUMENTS

| | | | |
|---|---|---|---|
| JP | 2001-268253 A | 9/2001 | |
| JP | 2002-044358 A | 2/2002 | |
| JP | 2004-159049 A | 6/2004 | |
| JP | 2004-165747 A | 6/2004 | |
| JP | 2006-186595 A | 7/2006 | |

* cited by examiner

FIG. 6
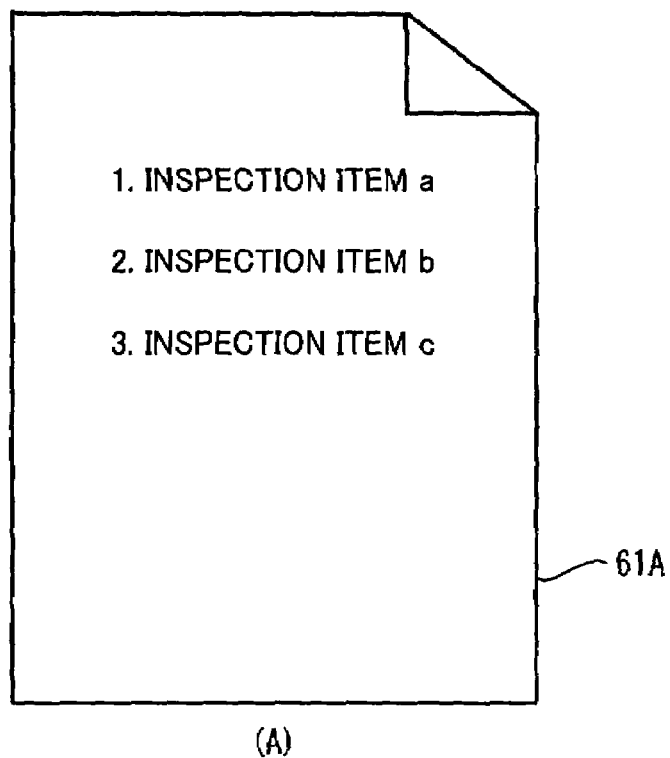
(A)
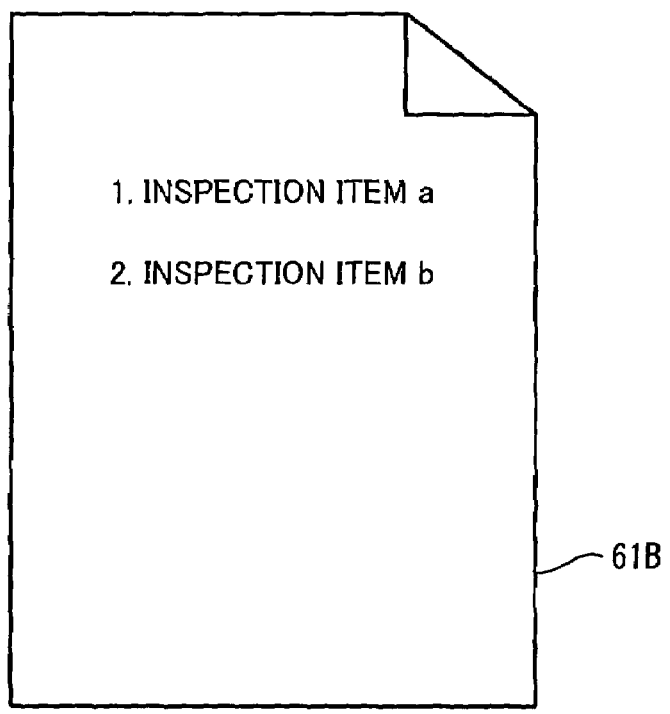
(B)

FILE TRANSMISSION TERMINAL

This application claims priority under 35 U.S.C. 119 to Japanese Patent Application No. 2006-157333, filed on Jun. 6, 2006, which application is hereby incorporated by reference in its entirety.

BACKGROUND OF THE INVENTION

1. Field of the Invention

The present invention relates to a terminal that transmits a file to a communication apparatus through a communication network.

2. Description of Related Art

There are various network systems that transmit a file from a transmission terminal to a reception terminal. In such network systems, there is a case in which a file is not delivered normally to the reception terminal due to various factors such as a line load status, an installation error, or a load status at the reception terminal.

Further, there is a system in which a reception terminal that has received a file returns the file to a source terminal. For example, a case in which the reception terminal executes a process based on the received file, and then returns a result of the process as a response file to the transmission terminal. In such a case, there is a case in which the response file is not returned to the transmission terminal due to various factors, even when the file is normally transferred from the transmission terminal to the reception terminal.

As described above, an error handling can occur in transmitting and receiving a file. When an error occurs, retransmission of the file is generally performed. In a conventional device management system, a device installed in a factory and such regularly transmits information to a management apparatus that performs management and maintenance. Then, when an error occurred in transmission, the device retransmits the information automatically for a plurality of times.

SUMMARY OF THE INVENTION

When only one transmission job is generated for a certain process, it is possible to complete the process by executing a retransmission process. However, the communication process becomes complicated when a new transmission job is generated in a situation where an error has already occurred in a different transmission job.

As an example, a maintenance system for devices is assumed in which a center operator transmits an inspection indication file to one of the devices. Suppose one operator transmits an inspection indication file in which inspection items are described to one of the devices, and a transmission error occurs. Further suppose that, in this situation, a different operator transmits an inspection indication file in which similar inspection items are described to the same device. In this case, the device returns inspection results to the inspection indication files respectively, and the center is to receive a plurality of inspection results as responses, and thus, making the process complicated. Moreover, when the error remains due to such as a line fault and an installation error, executing retransmission processes respectively for the plurality of transmission jobs makes a control complicated because a number of jobs are processed simultaneously.

Therefore, in order to overcome the problems described above, an object of a preferred embodiment of the present invention is to provide a file transmission technique that does not make retransmission control complicated even when a transmission error occurs.

The present invention provides a file transmission terminal including: a first generation unit that generates a transmission job for transmitting a transmission file to a communication apparatus; a transmission unit that transmits the transmission file to the communication apparatus according to the generated transmission job; a second generation unit that generates a retransmission job for the transmission file in a case in which an error occurs to the transmission job; and a control unit that, when a different transmission job for the communication apparatus is present in performing a retransmission process according to the retransmission job, deletes the retransmission job.

Further, the present invention provides a file transmission terminal including: a first generation unit that generates a transmission job for transmitting a transmission file to a communication apparatus; a transmission unit that transmits the transmission file to the communication apparatus according to the generated transmission job; a second generation unit that generates a retransmission job for the transmission file in a case in which an error occurs to the transmission job; and a control unit that, when a different transmission job for the communication apparatus is present in performing a retransmission process according to the retransmission job, deletes a retransmission job that has been generated first.

Further, the present invention provides a file transmission terminal including: a first generation unit that generates a transmission job for transmitting a transmission file to a communication apparatus; a transmission unit that transmits the transmission file to the communication apparatus according to the generated transmission job; a second generation unit that generates a retransmission job for the transmission file in a case in which an error occurs to the transmission job; and a control unit that, when a different transmission job for the communication apparatus is present in performing a retransmission process according to the retransmission job, deletes an overlapping information item described in the transmission file of the retransmission job with an information item described in a transmission file of the different transmission job, and then executes the retransmission job.

Further, the present invention provides a file transmission terminal including: a first generation unit that generates a transmission job for transmitting a transmission file to a communication apparatus; a transmission unit that transmits the transmission file to the communication apparatus according to the generated transmission job; a second generation unit that generates a retransmission job for the transmission file in a case in which an error occurs to the transmission job; and a control unit that, when a different retransmission job for the communication apparatus is present in performing a retransmission process according to the retransmission job, deletes an overlapping information item described in a transmission file of a retransmission job that has been generated first with an information item described in a transmission file of a retransmission job that has been generated subsequently, and then executes the retransmission job that has been generated first.

Moreover, in the present invention, the case in which an error occurs to the transmission job includes a case in which a response file is not received normally from the communication apparatus.

When performing the retransmission process according to the retransmission job, the file transmission terminal according to the present invention deletes the retransmission job if there is a different transmission job for the same communication apparatus. As a result, it is possible to prevent a number of jobs for the same communication apparatus from being overlappingly generated, thereby preventing retransmission control from becoming complex.

Further, when performing the retransmission process according to the retransmission job, the file transmission terminal according to the present invention deletes a retransmission job that has been generated first if there is a different retransmission job for the same communication apparatus. As a result, it is possible to prevent a number of retransmission jobs for the same communication apparatus from being overlappingly generated, thereby preventing the retransmission control from becoming complex.

Further, if there is a different transmission job for the same communication apparatus, the overlapping item out of items described in the transmission file of the retransmission job is deleted, and then the retransmission job is executed. As a result, it is possible to efficiently control the retransmission by selecting only a necessary process.

Further, if there is a different retransmission job for the same communication apparatus, the retransmission job that has been generated first is executed after the overlapping item is deleted. As a result, it is possible to efficiently control the retransmission by selecting only a necessary process out of the number of retransmission jobs.

Moreover, because the case in which the response file is not received from the communication apparatus that has received the transmission file is handled as an error to the transmission job, entire retransmission control is managed by the file transmission apparatus, thereby preventing the retransmission control from becoming complex.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 6(A) and 6(B) are diagrams illustrating inspection items described in inspection indication files.

DETAILED DESCRIPTION OF PREFERRED EMBODIMENT

Figure 1:
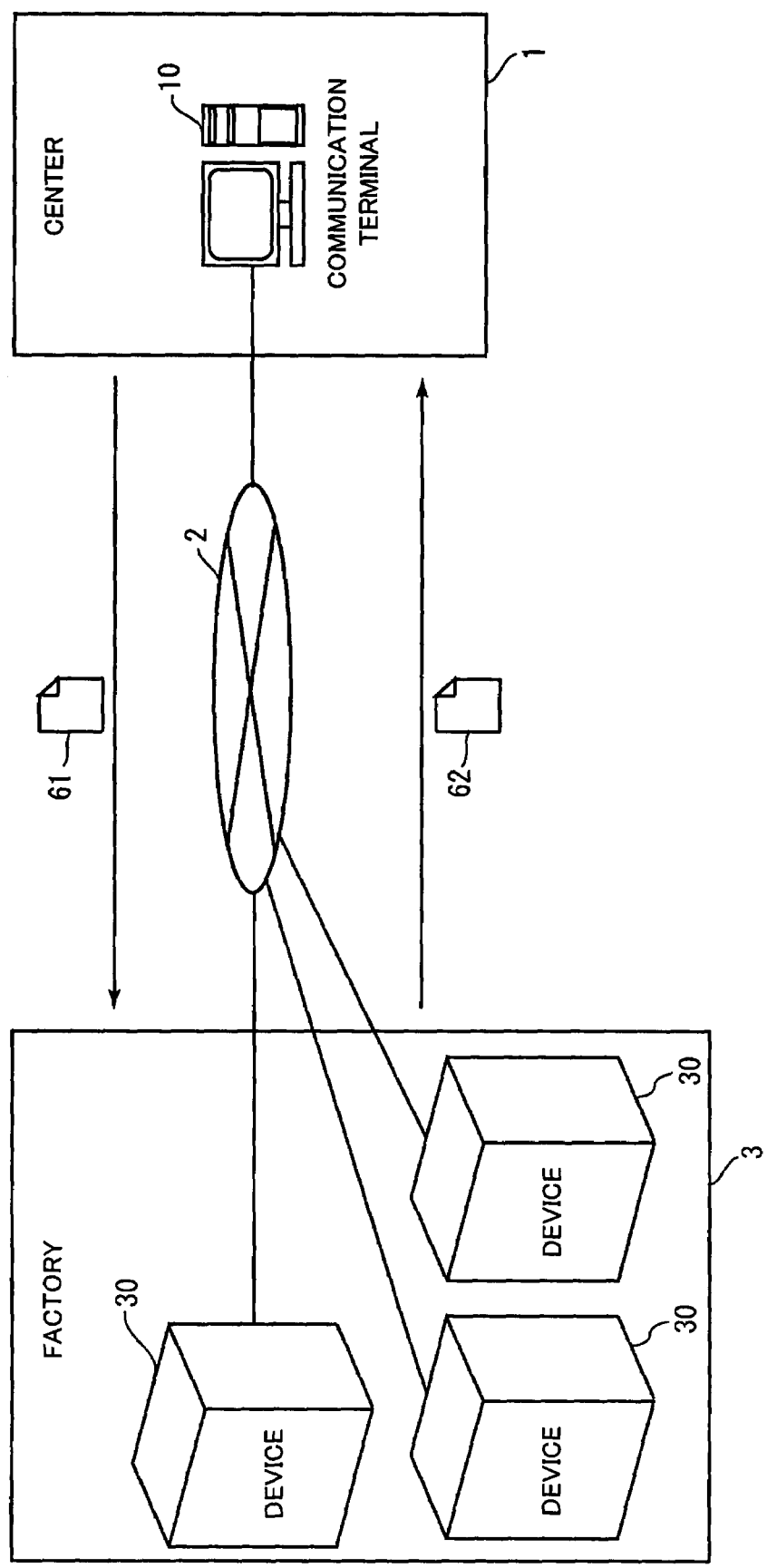
FIG. 1 is a system configuration diagram of a remote interactive communication system according to the present embodiment.

The following describes an embodiment according to the present invention with reference to the drawings. FIG. 1 is a system configuration diagram of a remote interactive communication system according to the present embodiment. This remote interactive communication system is configured by a communication terminal 10 provided in a center 1, apparatuses 30, 30, and . . . provided in a factory 3. The communication terminal 10 and each of the apparatuses 30 are connected through a network 2. The network 2 is constituted as the Internet, LAN, and such.

This remote interactive communication system is to remotely and interactively communicate with the apparatuses 30 provided in the factory 3 with the center 1 at a remote location. Specifically, an inspection indication file 61 is transmitted from the communication terminal 10 of the center 1 to one of the apparatuses 30 via network, and a result of an inspection performed at the apparatus 30 is returned as an inspection result file 62 from the apparatus 30 to the communication terminal 10 via the network 2. With this configuration, the center 1 at the remote location can diagnose the status of the apparatus 30 in the factory 3.

Figure 2:
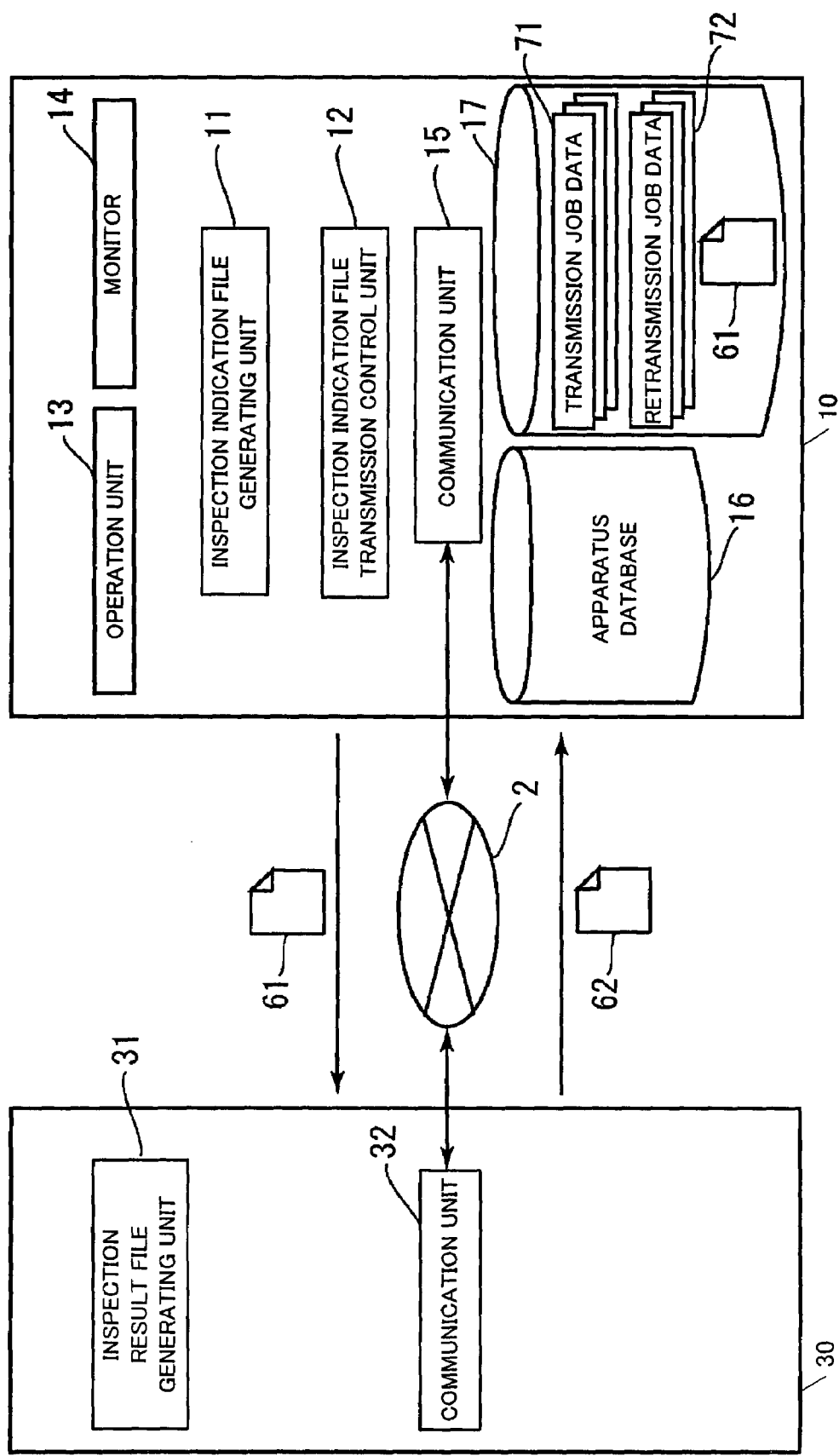
FIG. 2 is a block diagram of each device that constitutes the remote interactive communication system.

FIG. 2 is a functional block diagram of the communication terminal 10 and the apparatus 30. The communication terminal 10 includes an inspection indication file generating unit 11, an inspection indication file transmission control unit 12, an operation unit 13, a monitor 14, a communication unit 15, an apparatus database 16, and a memory 17.

The inspection indication file generating unit 11 is a processing unit that generates the inspection indication file 61 in which inspection items and inspection instruction commands to the apparatus 30 are described. An operator of the communication terminal 10 operates the operation unit 13 and instructs the inspection indication file generating unit 11 to generate the inspection indication file 61. The operator generates the inspection indication file 61 while confirming inspection contents displayed on the monitor 14.

The inspection indication file transmission control unit 12 generates transmission job data 71 corresponding to the generated inspection indication file 61 to control a transmission job. When an error occurs in transmitting the inspection indication file 61, the inspection indication file transmission control unit 12 generates retransmission job data 72, and performs such as retransmission control of the inspection indication file 61.

The communication unit 15 is a processing unit that transmits and receives data to and from other computers using a protocol such as TCP/IP. The communication unit 15 transmits and receives data with the apparatus 30 through the network 2.

The apparatus 30 includes an inspection result file generating unit 31 and a communication unit 32. The inspection result file generating unit 31 is a processing unit that performs an inspection to the apparatus 30, and then generates the inspection result file 62 in which the inspection results are described. Specifically, the inspection result file generating unit 31 performs the inspection to the apparatus 30 based on the inspection items or the inspection instruction commands described in the inspection indication file 61 that has been received from the communication terminal 10, and returns the results of the inspection to the communication terminal 10 as the inspection result file 62.

The communication unit 32 is a processing unit that transmits and receives data to and from other computers using a protocol such as TCP/IP. The communication unit 32 transmits and receives data to and from the communication terminal 10 through the network 2.

Figure 3:
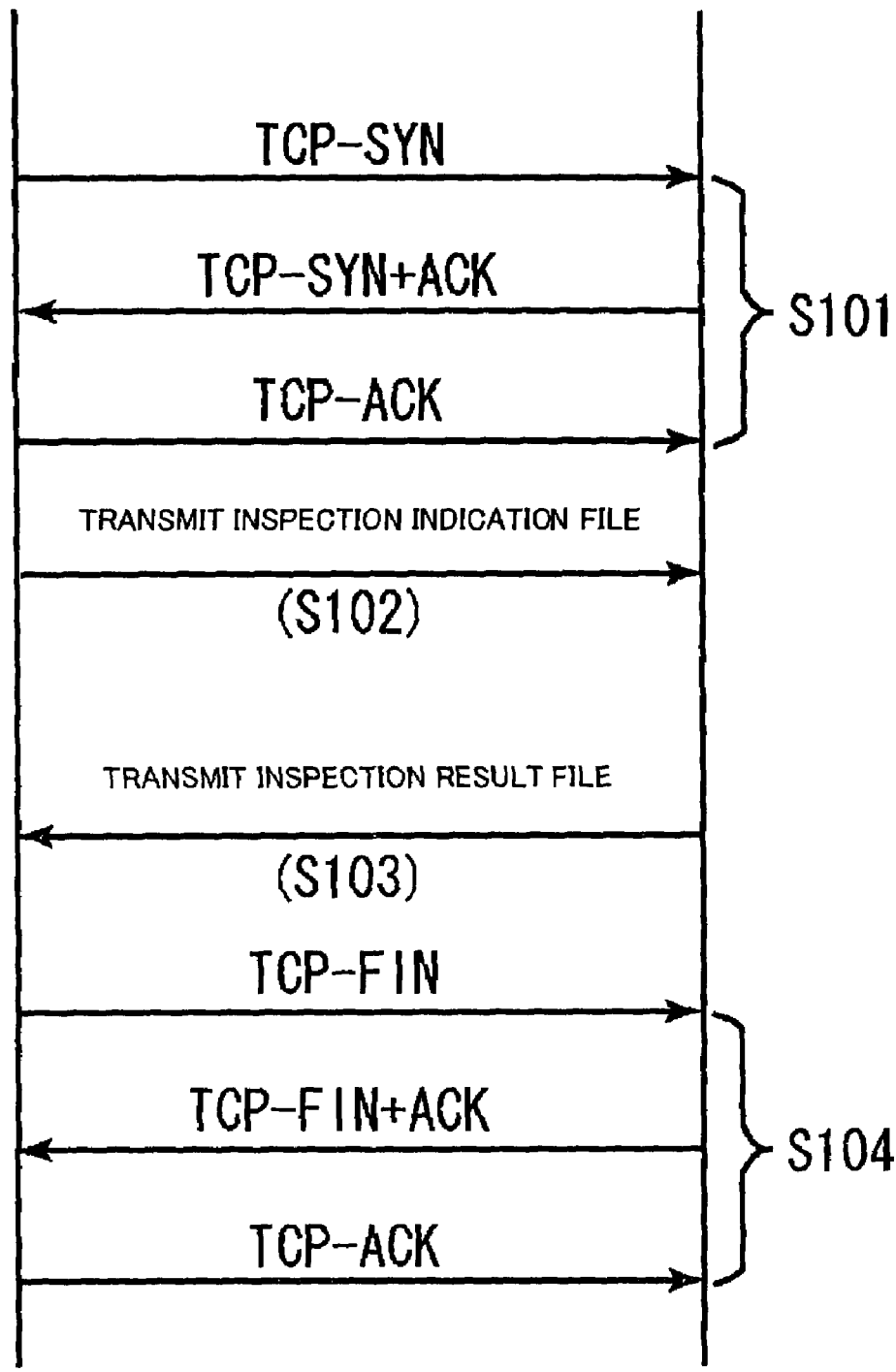
FIG. 3 is a diagram illustrating an overall process sequence of the remote interactive communication system.

The following describes a processing sequence of the remote interactive communication system as described above. FIG. 3 is a diagram illustrating a processing sequence between the communication terminal 10 and the apparatuses 30. However, the processing sequence in FIG. 3 is a sequence in a case in which an error does not occur in transmission and reception of a file, i.e. when all the processes are completed normally.

First, the operator operates the communication terminal 10 to instruct to start the inspection. Specifically, the operator operates the operation unit 13 to specify the apparatus 30 to be inspected and inspection items. In response to this operation, the inspection indication file generating unit 11 generates the inspection indication file 61. As shown in FIG. 2, the communication terminal 10 includes the apparatus database 16. In the apparatus database 16, an apparatus name and an IP address of each of the apparatus 30 in the factory 3 are managed in association with each other. When the operator operates to specify the apparatus 30 to be inspected, an apparatus name and an IP address of the apparatus 30 to be inspected are registered in the inspection indication file 61.

After the inspection indication file 61 is generated by the operator, the inspection indication file transmission control unit 12 generates the transmission job data 71. Then, according to the transmission job data 71, the communication unit 15 demands a TCP connection to the communication unit 32 of the apparatus 30. By this, a three-way handshake is performed, and a TCP connection is established between the communication terminal 10 and the apparatus 30 (Step S101).

Upon establishment of the TCP connection between the communication terminal 10 and the apparatus 30, the inspection indication file transmission control unit 12 transmits the inspection indication file 61 to the apparatus 30 (Step S102).

When the apparatus 30 receives the inspection indication file 61, the apparatus 30 executes the inspection according to the inspection items or the inspection instruction commands described in the inspection indication file 61. For example, the apparatus 30 measures a number of rotations of a motor of the apparatus 30, a temperature of the apparatus 30, a remaining memory capacity of the apparatus 30, and such. Then, the apparatus 30 generates the inspection result file 62 in which results of the inspection are recorded, and transmits the generated file to the communication terminal 10 (Step S103).

The communication terminal 10 demands a disconnection of the TCP connection to the apparatus 30 after receiving the inspection result file 62. Then, a three-way handshake is performed, and the TCP connection is disconnected (Step S104).

Figure 4:
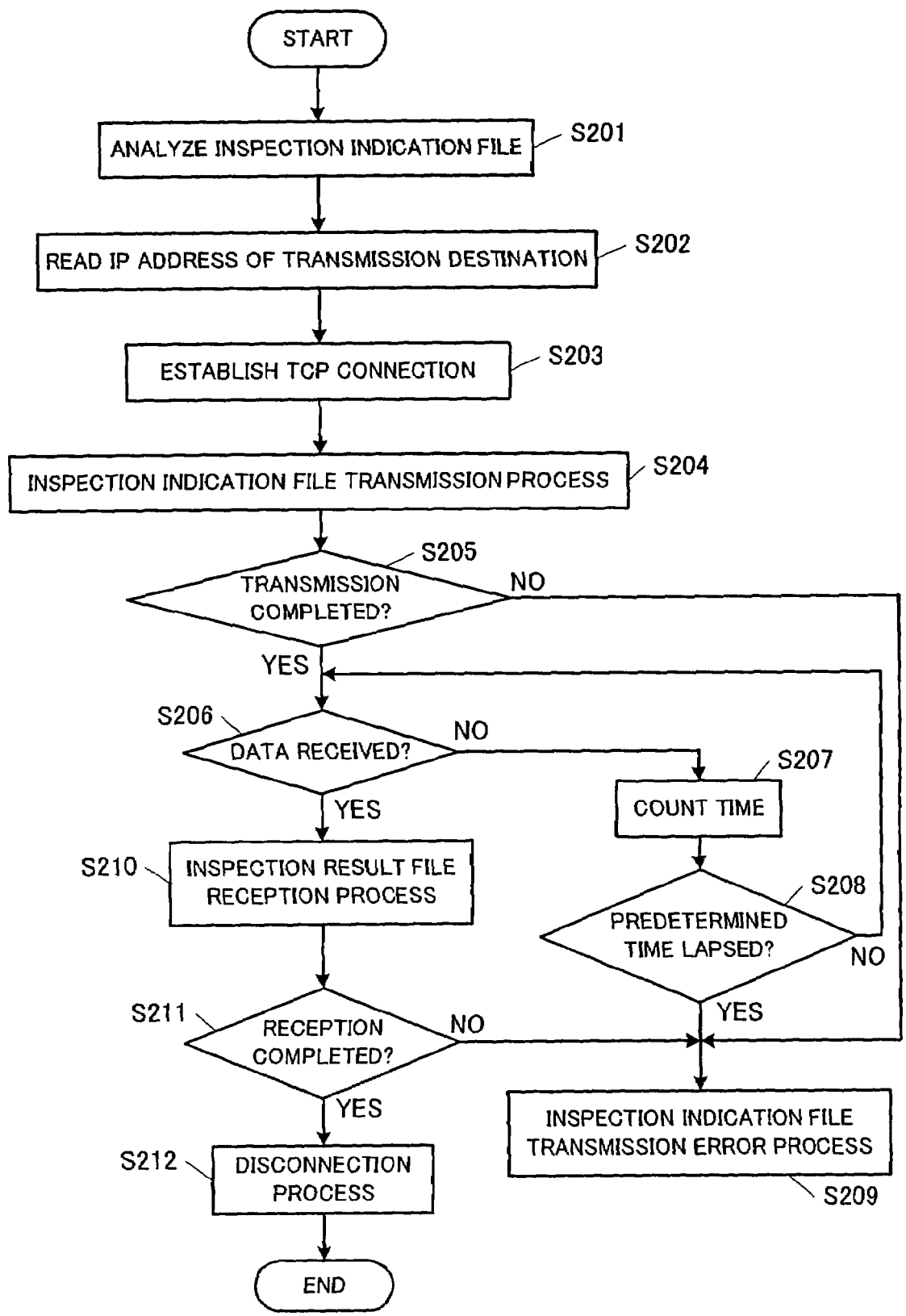
FIG. 4 is a process flowchart of a communication terminal.

The above described the processing sequence of the remote interactive communication system when normally processed. Next, a flow of remote interactive communication processing including a case in which an error occurs is explained based on the communication terminal 10. FIG. 4 is a flowchart of the remote interactive communication processing at the communication terminal 10.

As a previous step, the inspection indication file 61 is generated by an operation of the operator. The inspection indication file generating unit 11 refers to the apparatus database 16, and obtains an IP address of the apparatus 30 that has been specified by the operator as an object to be inspected, and then registers the IP address to the inspection indication file 61.

In such a situation, the inspection indication file transmission control unit 12 checks if the inspection indication file 61 has been generated. If the inspection indication file 61 has been generated, the inspection indication file transmission control unit 12 analyzes contents of the inspection indication file 61 (Step S201), and then reads the IP address of the apparatus 30 to be inspected from the inspection indication file 61 (Step S202). The inspection indication file transmission control unit 12 generates the transmission job data 71 corresponding to the analyzed inspection indication file 61, and registers the generated data in the memory 17. The transmission job data 71 contains information on time when the transmission job is generated, specification of the inspection indication file 61 to be transmitted, and such.

Next, the inspection indication file transmission control unit 12 starts a transmission process of the inspection indication file 61 based on the generated transmission job data 71. First, the communication unit 15 performs a TCP connection establishment process to the apparatus 30 (Step S203). Subsequently, the inspection indication file transmission control unit 12 performs the transmission process of the inspection indication file 61 to the apparatus 30 (Step S204), and checks if the transmission has been normally completed (Step S205).

In a case in which the transmission of the inspection indication file 61 has not been normally completed, the inspection indication file transmission control unit 12 performs an error process of the transmission of the inspection indication file 61 (Step S209). Specifically, the inspection indication file transmission control unit 12 deletes the transmission job data 71 that has been resulted in the transmission error, and newly generates retransmission job data 72 to register the data to the memory 17. The retransmission job data 72 contains information on time when the retransmission job is generated, specification of the inspection indication file 61 to be transmitted, and such. Here, the inspection indication file 61 that has been resulted in the transmission error is specified as a file to be transmitted in the retransmission job data 72.

The inspection indication file transmission control unit 12 is in a standby state waiting for reception of data when the transmission of the inspection indication file 61 has been normally completed (Step S206). The inspection indication file transmission control unit 12 starts to count time when the data is not received (Step S207), and goes into the standby state waiting for the reception of data until a predetermined time lapses (Step S208). Then, if the data has not been received when the predetermined time lapses, the transmission error process of the inspection indication file 61 is performed (Step S209). Specifically, the inspection indication file transmission control unit 12 deletes the transmission job data 71 that has been resulted in the transmission error, and newly generates the retransmission job data 72 to register the data to the memory 17.

When the data is received in Step S206, the inspection indication file transmission control unit 12 performs a reception process of the inspection result file 62 (Step S210). That is, the inspection indication file transmission control unit 12 performs the reception process of the inspection result file 62 that has been returned from the apparatus 30. Then, the inspection indication file transmission control unit 12 checks if the inspection result file 62 has been received normally (Step S211). When the transmission of the inspection result file 62 has not been normally completed, the inspection indication file transmission control unit 12 performs the transmission error process of Step S209. The content of the transmission error process is as described above.

When the reception of the inspection result file 62 has been completed normally, a TCP disconnection process is performed (Step S212). The contents of the inspection results recorded in the received inspection result file 62 are displayed on the monitor 14, for example. By this, the operator can refer to the inspection results.

Figure 5:
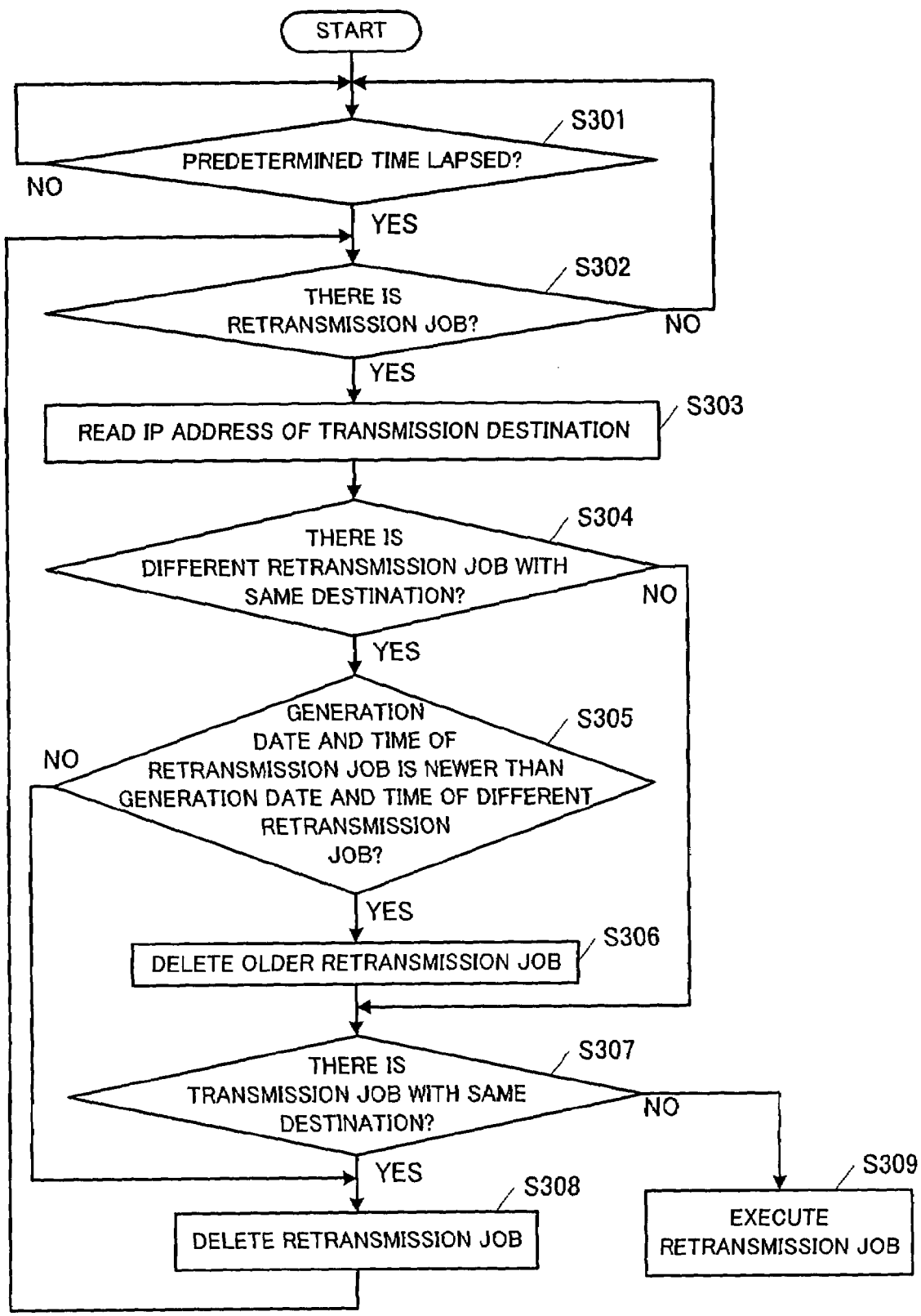
FIG. 5 is a process flowchart of the communication terminal.

Next, with reference to FIG. 5, a process flow for the retransmission control is described. The flowchart in FIG. 5 mainly shows a flow of the process controlled by the inspection indication file transmission control unit 12. The inspection indication file transmission control unit 12 is set with a time at which the retransmission control is performed, and when the set time has passed (YES in Step S301), the inspection indication file transmission control unit 12 checks if there is a retransmission job for which the retransmission time has come (Step S302). That is, the inspection indication file transmission control unit 12 refers to the retransmission job data 72 registered in the memory 17, and checks if the time for any retransmission job has come. As described above, the retransmission job data 72 is generated in the transmission error process in Step S209. Information of generation time is registered in the retransmission job data 72, and the inspection indication file transmission control unit 12 checks if the retransmission time that has been previously set has lapsed or not.

When there is a retransmission job whose retransmission time has come, the inspection indication file transmission control unit 12 obtains the IP address of the apparatus 30 to be inspected from the corresponding inspection indication file 61 (Step S303).

Then, the inspection indication file transmission control unit 12 checks if there is a different retransmission job that has the same destination (Step S304). That is, the inspection indication file transmission control unit 12 checks if there is the different retransmission job whose retransmission time has not come yet and that is for the same apparatus 30 to be inspected.

If there is no retransmission job with the same destination, the operation moves to Step S307. If there is a retransmission job with the same destination, the inspection indication file transmission control unit 12 compares times and dates when the retransmission job data 72 is generated (Step S305). If the retransmission job whose retransmission time has come is newly generated (YES in Step S305), the retransmission job that is generated first is deleted (Step S306). If the retransmission job whose retransmission time has come is generated first (NO in Step S305), this retransmission job is deleted (Step S308). That is, the retransmission job whose retransmission time has come is deleted. The time and date registered in the retransmission job data 72 are information of the date and the time when the retransmission job is generated first. The retransmission job once generated repeats retransmission for set times when an error occurs repeatedly, and even in this case, the information of the date and the time when the retransmission job is first generated is retained.

After the retransmission job that has been first generated is deleted in Step S306, the inspection indication file transmission control unit 12 checks if there is a transmission job that has the same destination (Step S307). When there is a transmission job for the same apparatus 30 to be inspected, the retransmission job is deleted (Step S308). That is, the retransmission job whose retransmission time has come is deleted.

If there is no transmission job for the same apparatus 30 to be inspected, the retransmission job is executed (Step S309). Specifically, the inspection indication file transmission control unit 12 establishes a TCP connection with the apparatus 30 to be inspected to transmit the inspection indication file 61.

As described above, the communication terminal 10 according to the present embodiment does not execute the retransmission process for the transmission error when there is an error in the transmission job for the inspection indication file 61 and if there is a transmission job for the same apparatus 30 as the destination is generated. Alternatively, if there is a different retransmission job, the older retransmission job is deleted. By this, it is possible to avoid a situation in which the process is complicated due to a plurality of inspection instructions generated for the same apparatus 30. For example, the management becomes complicated when there are a plurality of inspection results returned to the communication terminal 10 at different times. Moreover, the load for the apparatus 30 also increases because the apparatus 30 is required to receive the plurality of the inspection instructions. In this respect, according to the present embodiment, the communication terminal 10 manages so that more than one retransmissions for the same apparatus 30 are not generated, thereby preventing the retransmission control from being too complicated.

Here, a characteristic of a remote management system of the present invention is also in the transmission error in Step S209. That is, not only when there is an error in transmission of the inspection indication file 61 (NO in S205), but also when the data from the apparatus 30 is not received even after the predetermined time lapses (YES in S208), as well as when the inspection result file 62 is not received normally (NO in S211), the communication terminal 10 processes as a transmission error of the inspection indication file 61. That is, the case in which the inspection indication file 61 has been normally transmitted to the apparatus 30 but the inspection result file 62 is not normally received is also determined to be a transmission error on the side of the communication terminal 10. On the other hand, according to the system of the present embodiment, the apparatus 30 is configured not to perform retransmission control when an error is detected in transmission of the inspection result file 62. This is because all the transmission control is performed on the side of the communication terminal 10 in order to prevent the retransmission control from being complex, and further in order to delete the inspection indication file for an old retransmission job when there is a new inspection indication file.

Next, modified examples of the present invention are described. In the above embodiment, when there are transmission jobs or retransmission jobs for the same destination (the apparatus 30), the communication terminal 10 performs the retransmission control. That is, the retransmission control is performed based on the destination IP address regardless of contents of the inspection items described in the inspection indication file 61.

In one modified example, the inspection items described in the inspection indication file 61 may be considered. For example, assume that the inspection indication file 61A to one of the apparatuses 30 includes the contents as shown in FIG. 6(A). That is, inspection items a, b, and c are described in the inspection indication file 61A. This file is an instruction to the apparatus 30 to perform the inspection on three items.

Here, a situation in which an error occurs in a transmission job for the inspection indication file 61A and the retransmission control for the inspection indication file 61A is performed. At this time, assume there is a new transmission job with the apparatus 30 as the destination. Assume that an inspection indication file 61B for the new transmission job is as shown in FIG. 6(B). That is, the inspection items a and b are described in the inspection indication file 61B.

Figure 7:
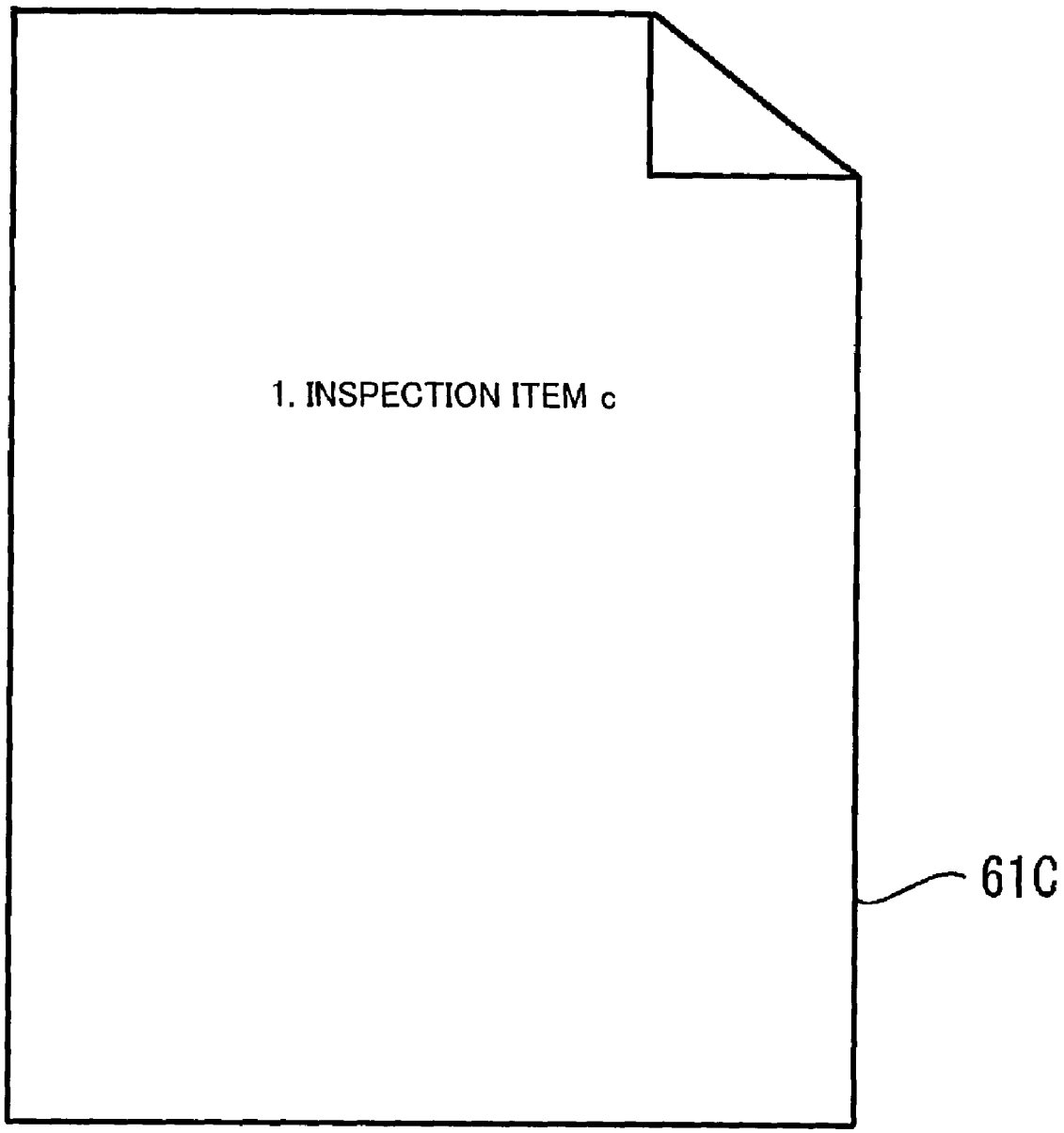
FIG. 7 is a diagram illustrating an inspection indication file after overlapping items are deleted.

In this case, instead of deleting the retransmission job, items that overlap with the items in the inspection indication file 61B are deleted from the inspection indication file 61A that relates to the retransmission job. Then, the retransmission job for an inspection indication file 61C as shown in FIG. 7 is executed. That is, the retransmission job instructs to inspect on only the inspection item c. In this manner, only the overlapped items are deleted, thereby performing efficient retransmission control.

Further, the same applies to a case in which both of the inspection indication file 61A and the inspection indication file 61B are the retransmission jobs. An item that overlaps with an item in a newly generated inspection indication file is deleted from an inspection indication file that has been first generated. For example, when a retransmission job corresponding to the inspection indication file 61A is generated first, and then a retransmission job corresponding to the inspection indication file 61B is generated, the inspection indication file 61A that is generated first is rewritten to the inspection indication file 61C to perform the retransmission control.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A file transmission terminal comprising:
   an inspection file generating unit for generating an inspection indication file, which includes an inspections item or instruction command;
   a first generation unit that generates a transmission job for transmitting the inspection indication file to a communication apparatus;
   a transmission unit that transmits the inspection indication file to the communication apparatus according to the generated transmission job;
   a second generation unit that generates a first retransmission job for the inspection indication file in a case in which an error occurs to the transmission job;
   a control unit that determines if a second retransmission job for the communication apparatus is present before performing a retransmission process according to the first retransmission job and deletes the first retransmission job based on the determination that the second retransmission job is present; and
   a reception unit that receives an inspection result file from the communication apparatus, the inspection result file being generated based on the execution of the transmitted inspection indication file by the communication apparatus.

2. A file transmission terminal comprising:
   an inspection file generating unit for generating an inspection indication file, which includes an inspection item or instruction command;
   a first generation unit that generates a transmission job for transmitting the inspection indication file to a communication apparatus;
   a transmission unit that transmits the inspection indication file to the communication apparatus according to the generated transmission job;
   a second generation unit that generates a first retransmission job for the inspection indication file in a case in which an error occurs to the transmission job;
   a control unit that determines if a second retransmission job for the communication apparatus is present before performing a retransmission process according to the retransmission job, deletes an overlapping information item described in the inspection indication file of the first retransmission job with an information item described in another inspection indication file of the second retransmission job, and then executes the first retransmission job; and
   a reception unit that receives an inspection result file from the communication apparatus, based on the execution of the transmitted inspection indication file by the communication apparatus.

3. The file transmission terminal according to claim 1, wherein the case in which the error occurs to the transmission job includes a case in which a response file to the inspection indication file is not received normally from the communication apparatus.

4. The file transmission terminal according to claim 2, wherein the case in which the error occurs to the transmission job includes a case in which a response file to the inspection indication file is not received normally from the communication apparatus.

5. A file transmission terminal comprising:
   an inspection file generating unit for generating an inspection indication file, which includes an inspection item or instruction command;
   a first generation unit that generates a transmission job for transmitting the inspection indication file to a communication apparatus;
   a transmission unit that transmits the inspection indication file to the communication apparatus according to the generated transmission job;
   a second generation unit that generates a first retransmission job for the inspection indication file in a case in which an error occurs to the transmission job;
   a control unit that determines if a second retransmission job for the communication apparatus is present before performing a retransmission process according to the first retransmission job and deletes a retransmission job that has been generated first out of the first retransmission job and the second retransmission job; and
   a reception unit that receives an inspection result file from the communication apparatus, based on the execution of the transmitted inspection indication file by the communication apparatus.

6. A file transmission terminal comprising:
   an inspection file generating unit for generating an inspection indication file, which includes an inspection item or instruction command;
   a first generation unit that generates a transmission job for transmitting the inspection indication file to a communication apparatus;
   a transmission unit that transmits the inspection indication file to the communication apparatus according to the generated transmission job;
   a second generation unit that generates a first retransmission job for the inspection indication file in a case in which an error occurs to the transmission job; and
   a control unit that determines if a second retransmission job for the communication apparatus is present in performing a retransmission process according to the first retransmission job, deletes an overlapping information item described in a inspection indication file of a retransmission job that has been generated first out of the first retransmission job and the second retransmission job with an information item described in a inspection indication file of a retransmission job that has been generated subsequently, and then executes the retransmission job that has been generated first; and
   a reception unit that receives an inspection result file from the communication apparatus, based on the execution of the transmitted inspection indication file by the communication apparatus.

7. The file transmission terminal according to claim 5, wherein the case in which the error occurs to the transmission job includes a case in which a response file to the inspection indication file is not received normally from the communication apparatus.

8. The file transmission terminal according to claim 6, wherein the case in which the error occurs to the transmission job includes a case in which a response file to the inspection indication file is not received normally from the communication apparatus.

* * * * *